US012109857B2

United States Patent
Lee et al.

(10) Patent No.: US 12,109,857 B2
(45) Date of Patent: Oct. 8, 2024

(54) HITCH ASSEMBLY

(71) Applicant: Midway Products Group, Inc., Monroe, MI (US)

(72) Inventors: David M. Lee, Newport, MI (US); Kenneth R. Laskie, Belleville, MI (US); Randy Schott, Temperance, MI (US)

(73) Assignee: Midway Products Group, Inc., Monroe, MI (US)

( * ) Notice: Subject to any disclaimer, the term of this patent is extended or adjusted under 35 U.S.C. 154(b) by 0 days.

(21) Appl. No.: 18/210,335

(22) Filed: Jun. 15, 2023

(65) Prior Publication Data

US 2023/0322031 A1    Oct. 12, 2023

Related U.S. Application Data

(63) Continuation of application No. 16/702,801, filed on Dec. 4, 2019, now Pat. No. 11,679,636.

(60) Provisional application No. 62/775,978, filed on Dec. 6, 2018.

(51) Int. Cl.
| | |
|---|---|
| *B60D 1/52* | (2006.01) |
| *B60D 1/06* | (2006.01) |
| *B60D 1/145* | (2006.01) |
| *B60D 1/48* | (2006.01) |

(52) U.S. Cl.
CPC .............. *B60D 1/52* (2013.01); *B60D 1/065* (2013.01); *B60D 1/145* (2013.01); *B60D 1/485* (2013.01)

(58) Field of Classification Search
CPC .......... B60D 1/485; B60D 1/52; B60D 1/065; B60D 1/145
See application file for complete search history.

(56) References Cited

U.S. PATENT DOCUMENTS

| | | | | |
|---|---|---|---|---|
| 4,148,498 | A * | 4/1979 | Taylor, Jr. ............... | B60G 11/36 280/490.1 |
| 5,242,186 | A * | 9/1993 | Pettersson ................ | B60D 1/52 280/491.5 |
| 6,412,315 | B1 * | 7/2002 | Cheng ....................... | B60D 1/52 280/507 |
| 6,824,156 | B2 * | 11/2004 | Smith ....................... | B60D 1/52 280/490.1 |
| 8,408,577 | B2 * | 4/2013 | Works ....................... | B60D 1/46 280/491.1 |

(Continued)

FOREIGN PATENT DOCUMENTS

EP         3178679 A1 *  6/2017  ............... B60D 1/02

*Primary Examiner* — Minnah L Seoh
*Assistant Examiner* — Hosam Shabara
(74) *Attorney, Agent, or Firm* — Barnes & Thornburg LLP

(57) ABSTRACT

A vehicle hitch assembly is provided. The receiver tube is connectable with a bumper structure and defines a longitudinally-extending opening. The hitch assembly includes a drawbar assembly with an elongated body and a rod. The elongated body is dimensioned to be received within the opening in the receiver tube and defines a longitudinally-extending passageway. The rod is rotatably received within the longitudinally-extending passageway between a first position and a second position. The rod includes a detent feature that couples together the elongated body and the receiver tube when the rod is rotated to the second position and detaches the elongated body and the receiver tube when the rod is rotated to the first position.

7 Claims, 6 Drawing Sheets

(56) References Cited

U.S. PATENT DOCUMENTS

| | | | | |
|---|---|---|---|---|
| 9,199,520 | B2* | 12/2015 | Weipert | B60D 1/46 |
| 9,499,020 | B2* | 11/2016 | Degenkolb | B60D 1/565 |
| 11,007,831 | B2* | 5/2021 | Nance | B60D 1/06 |
| 11,104,189 | B2* | 8/2021 | Rotenberg | B60D 1/52 |
| 11,577,561 | B2* | 2/2023 | Belinky | B60D 1/64 |
| 11,679,636 | B2* | 6/2023 | Lee | B60D 1/145 |
| | | | | 280/491.5 |
| 2020/0001672 | A1* | 1/2020 | Sanchez Lafuente Ayala | |
| | | | | B60D 1/52 |
| 2022/0219500 | A1* | 7/2022 | Shaeff | B60D 1/06 |

* cited by examiner

HITCH ASSEMBLY

RELATED APPLICATIONS

This is a continuation application of U.S. patent application Ser. No. 16/702,801 filed Dec. 4, 2019 for a "Hitch Assembly," now U.S. Pat. No. 11,679,636, which claimed the benefit of U.S. Provisional Application Ser. No. 62/775,978 filed Dec. 6, 2018 for a "Hitch Assembly," both of which are hereby incorporated by reference in their entireties.

TECHNICAL FIELD

This disclosure relates generally to hitch assemblies for vehicles; in particular, this disclosure relates to a hitch assembly with a detachable drawbar.

BACKGROUND

Vehicles, such as trucks, cars, SUVs, and station wagons, are commonly used to tow trailers, boats and/or other loads. A hitch installed to the vehicle's frame, such as the bumper structure, provides a towing connection for the vehicle. There are several types of hitches that can be installed. For example, one type of hitch is commonly known as a "European-style" hitch. With a European-style hitch, the receiver tube to which the drawbar is connected is hidden from view. Although this style of hitch has certain beneficial features, connecting and disconnecting the drawbar can be difficult and time consuming.

Therefore, a need exists that overcomes one or more of the disadvantages of present hitch assemblies.

SUMMARY OF THE INVENTION

According to one aspect, this disclosure provides a hitch assembly. In some embodiments, the hitch assembly includes a bracket attachable to a bumper structure. A receiver tube connects with the bracket and defines a longitudinally-extending opening. The hitch assembly includes a drawbar assembly with an elongated body and a rod. The elongated body is dimensioned to be received within the opening in the receiver tube and defines a longitudinally-extending passageway. The rod is rotatably received within the longitudinally-extending passageway between a first position and a second position. In some embodiments, the drawbar assembly includes a section extending approximately perpendicularly from the elongated body. The rod includes a detent feature that couples together the elongated body and the receiver tube when the rod is rotated to the second position and detaches the elongated body and the receiver tube when the rod is rotated to the first position.

BRIEF DESCRIPTION OF THE DRAWINGS

The present disclosure will be described hereafter with reference to the attached drawings which are given as non-limiting examples only, in which.

Figure 1:
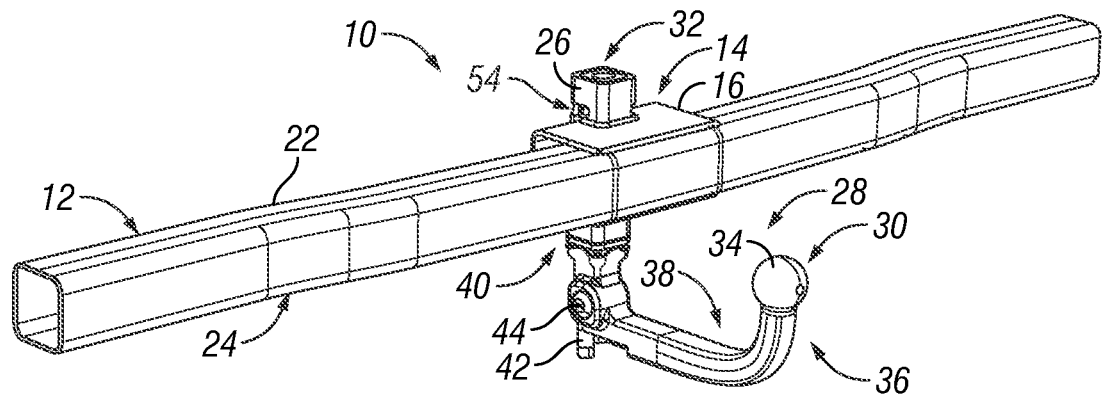
FIG. 1 is front perspective view of an example hitch assembly in the unlocked position connected to a vehicle bumper structure according to an embodiment of the present disclosure.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

FIG. 1 is a perspective view of a hitch assembly 10 according to an embodiment of this disclosure. In the example shown, the hitch assembly 10 is connected with a bumper structure 12. The term "bumper structure" is broadly intended to include any portion of the vehicle frame structure, but is typically the vehicle's frame structure for the bumper. In some embodiments, the hitch assembly 10 includes a bracket 14 attachable to the bumper structure 12. As shown, the bracket 14 has a C-shape with a first section 16 and a second section 18 connected with a third section 20 (FIGS. 3-6). In this example, the first section 16 is attached to a top portion 22 of the bumper structure 12 and the third section 20 is attached to a bottom portion 24 of the bumper structure 12. The bracket 14 could be attached to the bumper structure 12 in a variety ways, such as welding, adhesive, fasteners, and/or fastening techniques.

In the embodiment shown, the hitch assembly 10 includes a receiver tube 26 connected with the bracket 14. As shown, the receiver tube 26 is generally vertically oriented and approximately perpendicular to the longitudinal axis of the bumper structure 12. The receiver tube 26 has an opening therethrough that is dimensioned to receive a portion of a drawbar assembly 28.

As shown, the drawbar assembly 28 includes a proximate end 30 and a distal end 32. In this embodiment, the proximate end 30 terminates with a ball 34 for connecting a trailer or other apparatus. As shown, the drawbar assembly 28 extends between the ball 34 and the distal end 32 with a first section 36, a second section 38, and a third section 40. As shown, the first section 36 defines a curved shape between the ball 34 and the second section 38, but the first section 36 could have other shapes depending on the circumstances. In the embodiment shown, the second section 38 extends generally horizontally and the third section 40 extends generally vertically into the receiver tube 26. The third section 40 can be detachably connected with the receiver tube 26 as explained below.

As shown, the drawbar assembly 28 includes a handle 42 that is movable between a first position (FIGS. 1, 2, 3) and a second position (FIG. 5) to actuate a detent feature that attaches and detaches the drawbar assembly to/from the receiver tube 26. In the first position, the drawbar assembly 28 can be detached from the receiver tube 26. In the second position, the handle 42 can be used to lock the drawbar assembly 28 with the receiver tube 26. In this example, the handle 42 pivots between the first position and the second position. Accordingly, a user could insert the third section 40 of the drawbar assembly 28 into the receiver tube 26 with the handle 42 in the first position and then move the handle 42 to the second position to attach the third section 40 to the receiver tube 26, thereby attaching the two together.

At the junction between the second section 38 and the third section 40, the drawbar assembly includes a lock 44 in the embodiment shown that is configured to lock the position of the handle 42. With the lock 44 in a locked position, the handle 42 is fixed in position and cannot move between the first position and the second position. This allows the drawbar assembly 28 to be locked in place to the receiver tube 26 and the handle 42 will be unable to move to the first position to detach the drawbar assembly 28 from the receiver tube 26. For example, the user could insert the distal end 32 of the drawbar assembly 28 into the receiver tube 26 and move the handle 42 from the first position to the second position to attach the two together. Next, the user could move the lock 44 to the locked position to prevent the drawbar assembly 28 from detaching from the receiver tube 26.

Figure 2:
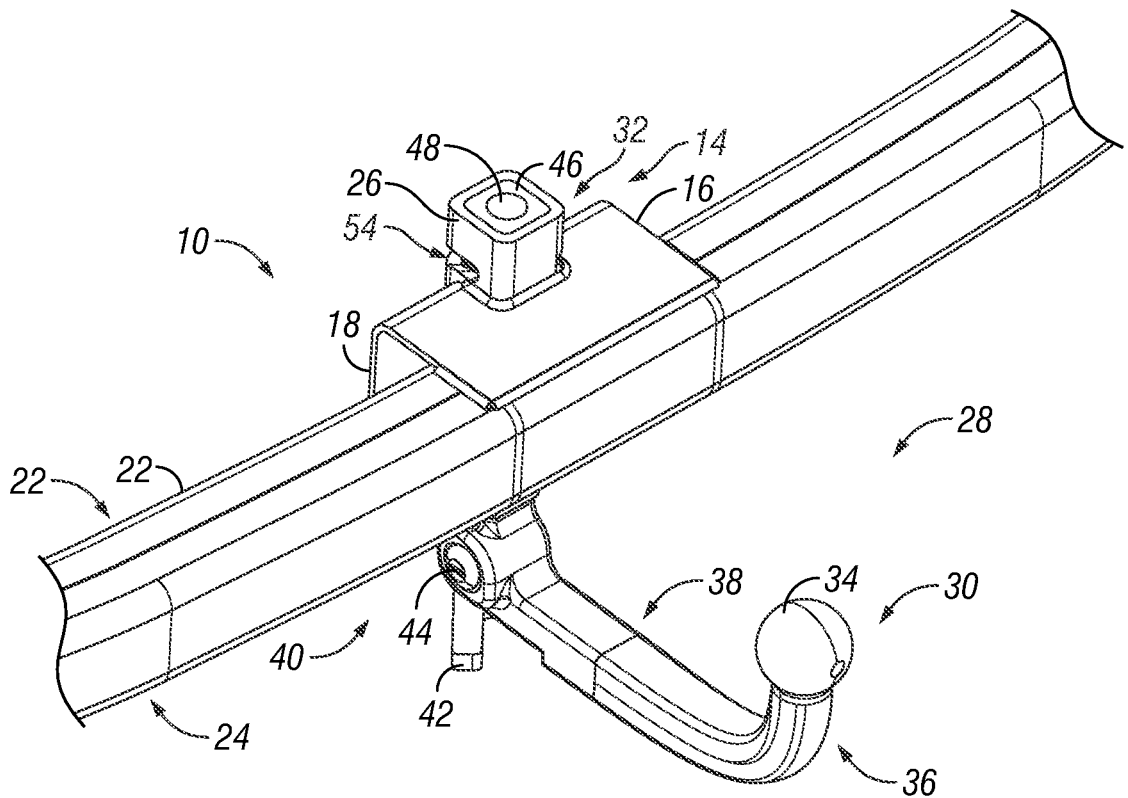
FIG. 2 is a detailed perspective view of the hitch assembly shown in FIG. 1 according to an embodiment of the present disclosure.

Referring to FIG. 2, the third section 40 of the drawbar assembly 28 includes an elongated body 46 (best seen in FIG. 5) that is dimensioned to be received within the receiver tube 26. In the embodiment shown, the elongated body 46 has an approximately square cross-section. As shown, the shape of the elongated body 46 conforms to the internal opening in the receiver tube 26. This limits rotation of the elongated body 46 within the receiver tube 26. Although this embodiment shows the elongated body 46 as having an approximately square cross-section, other cross-sectional shapes could be used, such as triangle, rectangle, pentagon, or other polygon that limits rotation of the elongated body 46 with respect to the receiver tube 26.

In the embodiment shown, the elongated body 46 has a passage therethrough that is dimensioned to receive an inner rod 48. As shown, the inner rod 48 can rotate within the elongated body 46. The inner rod 48 includes radially extending pins 50 (best seen in FIGS. 5-10). In the embodiment shown, the elongated body 46 includes slots 52 (best seen in FIG. 5) that receive the pins 50 extending from the inner rod 48. The receiver tube 26 also includes slots 54 correspondingly arranged with the slots 52 in the elongated body 46 when the elongated body 46 is inserted into the receiver tube 26.

The handle 42 is connected with an inner rod 46 and the inner rod 46 pivots concomitant with the handle 42. This allows the handle 42 to move the pins 50 within the slots 52, 54 by pivoting the handle 42. When the elongated body 46 is inserted into the receiver tube 26, the pins 50 can extend through the slots 52 in the elongated body 46 and the slots 54 in the receiver tube 26 depending on the position of the handle 42. When the handle 42 is rotated to the first position, the pins 50 are free of the slots 54 and the drawbar assembly 28 can be detached from the receiver tube 26. When the handle 42 is rotated to the second position, the pins 50 extend through the slots 54 and the drawbar assembly 28 is attached with the receiver tube 26.

Figure 3:
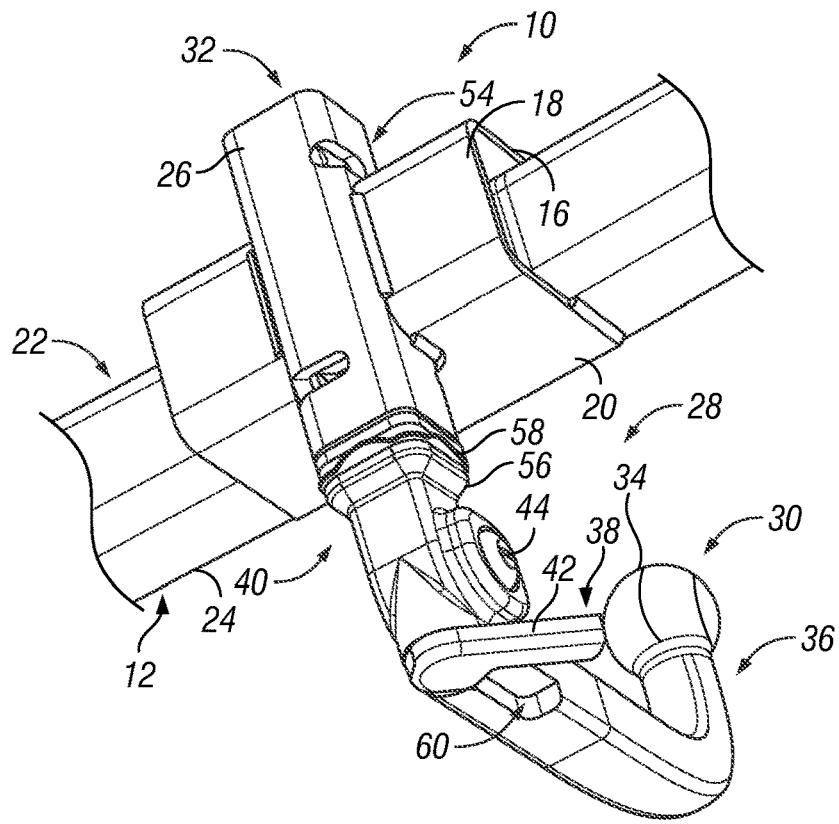
FIG. 3 is rear perspective view of the hitch assembly shown in FIG. 1 according to an embodiment of the present disclosure.
Figure 4:
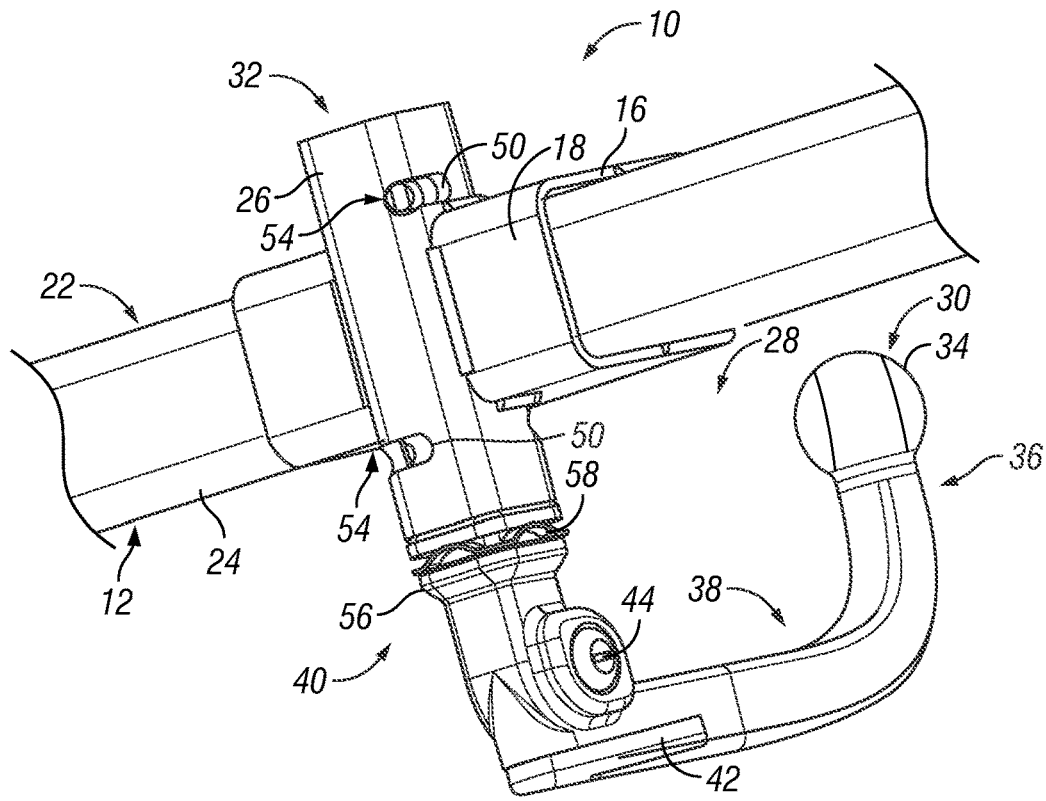
FIG. 4 is rear perspective view of the hitch assembly shown in FIG. 3 in the locked position according to an embodiment of the present disclosure.

FIGS. 3 and 4 show a rear perspective view of the example hitch assembly 10. In these views, the third section 40 of the drawbar assembly 28 includes a flange 56. A spring 58 (or other biasing member) is disposed on the drawbar assembly 28 between the flange 56 and the receiver tube 26. The spring 58 urges the drawbar assembly 28 away from the receiver tube 26. In the embodiment shown, the flange 56 is dimensioned approximately corresponding with an external dimension of the receiver tube 26. As shown, the flange 56 acts as a stop that prevents further movement of the drawbar assembly 28 into the receiver tube 26. This allows the slots 52, 54 to be aligned when the drawbar assembly 28 is inserted into the receiver tube 26. In the embodiment shown, the receiver tube 26 includes a slot 54 above the bumper structure 12 and a slot 54 below the bumper structure 12. This allows a secure connection between the drawbar assembly 28 and the receiver tube 26.

In the embodiment shown, the second section 38 includes a recessed area 60 dimensioned to receive the handle 42. For example, the recessed area 60 allows the handle 42 to be received so the external surface of the handle 42 is flush with the second section 38.

As discussed above, movement of the handle 42 can be used to move the pins 50. In FIG. 3, the handle 42 is in the first position corresponding to the pins 50 being free of the slots 54 of the receiver tube 26, which detaches the drawbar assembly 28 from the receiver tube 26. In FIG. 4, the handle 42 has been moved to the second position corresponding to the pins 50 extending into the slots 54 of the receiver tube 26. In this position, the pins 50 help attach the drawbar assembly 28 to the receiver tube 26.

Figure 5:
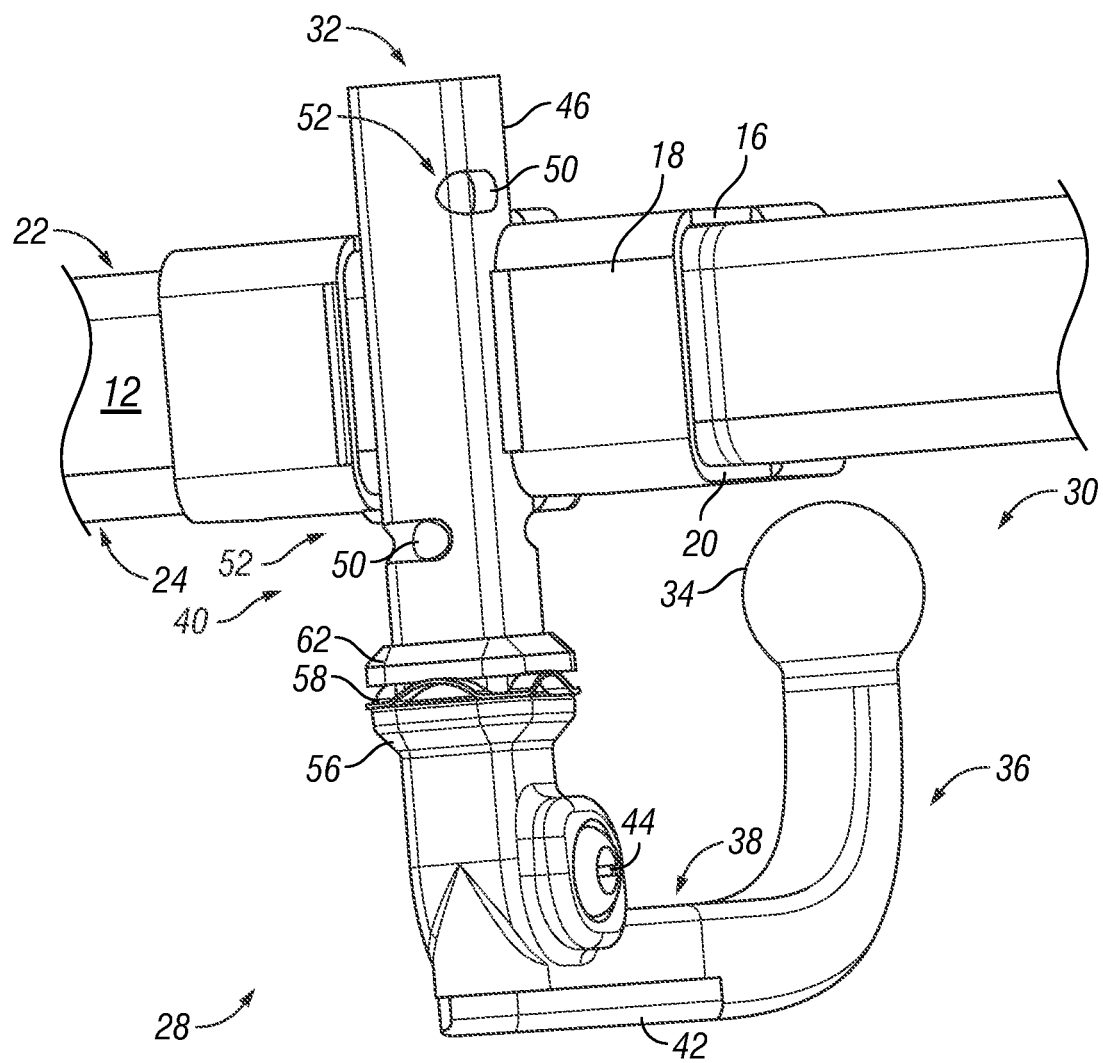
FIG. 5 is a rear perspective view of the hitch assembly shown in FIG. 4 with the receiver tube removed to reveal internal components.

FIG. 5 shows the example hitch assembly 10 without the receiver tube 26 to better show the drawbar assembly 28. As shown, the drawbar assembly 28 includes a slot 52 above the bumper structure 12 and a slot 52 below the bumper structure 12, which correspond to the positions of the slots 54 in the receiver tube 26. As shown in this embodiment, the inner rod 48 is rotatable within the elongated body 46, which moves the pins 50 within the slots 52. In the embodiment shown, the drawbar assembly 28 includes a wedge plate 62, in addition to the flange 56 trap the spring 58 therebetween. Although this example shows the wedge plate 62 as part of the drawbar assembly 28, the wedge plate 62 could be part of the receiver tube 26 depending on the circumstances.

Figure 6:
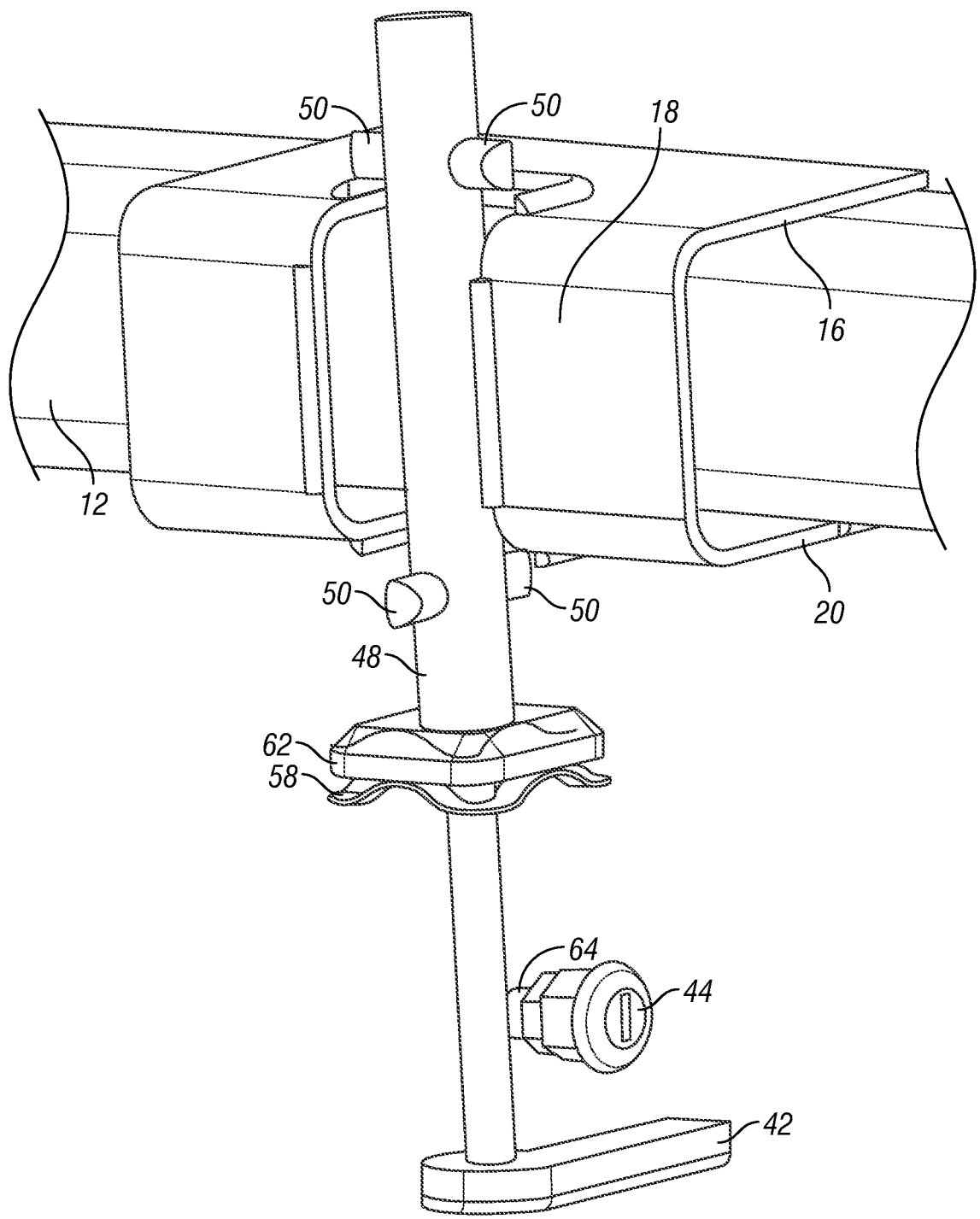
FIG. 6 is a rear perspective view of the hitch assembly shown in FIG. 5 with the outer portion of the drawbar assembly removed to reveal internal components.

FIG. 6 shows the example hitch assembly 10 without certain components to reveal the inner rod 48. In this view, the inner rod 48 has a substantially cylindrical shape. As shown, the inner rod 48 has an end connected to the handle 42. In this embodiment, the inner rod 48 extends through the third section 40 of the drawbar assembly 28. As shown, two pins 50 extend radially from the inner rod 48 above the bumper structure 12 and two pins 50 extend radially from the inner rod 48 below the bumper structure 12. Although this example shows two pins 50 above and below the bumper structure 12, there may be more or less pins depending on the circumstances. The lock 44 includes a pin 64 that is movable between a first position (unlocked) that allows rotation of the inner rod 48 and a second position (locked) that blocks rotation of the inner rod 48. As shown, the lock 44 includes a keyway that can be used to rotate the pin between the unlocked and locked positions; however, other types of locks could be used. The lock 44 allows actuation of the handle 42 to be selectively controlled.

FIGS. 7-10 provide detailed views of the slots 54 and the pins 50 to show that the slots 54 in the receiver tube 26 have a curved bottom surface 66 on which the pins 50 cam. This camming action moves the third section 40 of the drawbar assembly 28 upward against the bias of the spring 58. The force of the spring 58 against the wedge plate 62 and the flange 56, in conjunction with the pins 50 locks the drawbar assembly 28 to the receiver tube 26.

Figure 7:
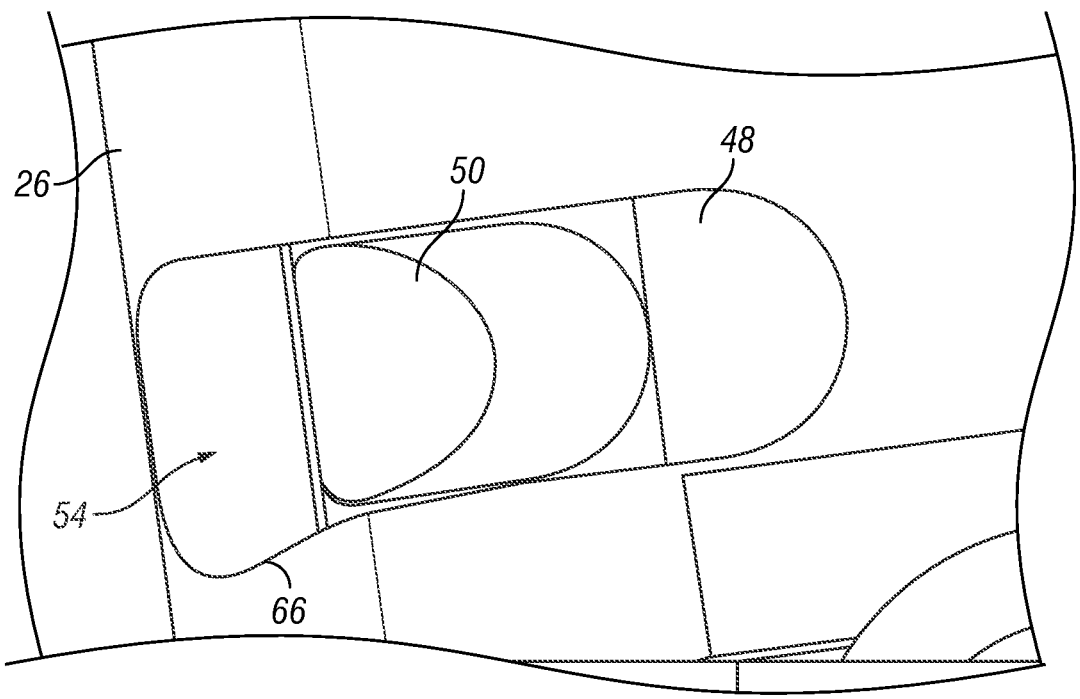
FIG. 7 is a detailed side view of the drawbar assembly with the pin rotated to the first position.
Figure 8:
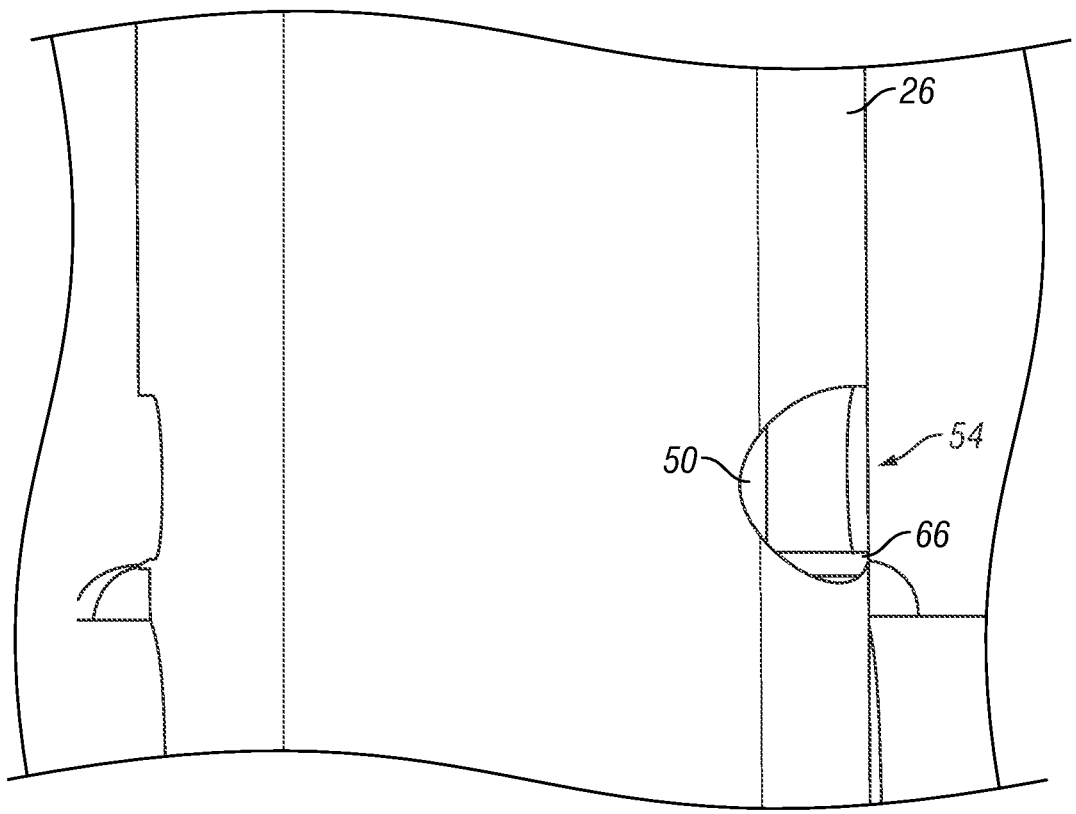
FIG. 8 is a detailed rear view of the drawbar assembly with the pin rotated to the first position.

FIGS. 7 and 8 show the relative position of the pins 50 with respect to the slots 54. The position shown in FIGS. 7 and 8 correspond with the handle 42 being in a first position, in which the third section 40 of the drawbar assembly 28 can be detached from the receiver tube 26. As can be seen, the pins 50 in this position fully clear the slots 54 and do not extend out into the slots 54. Accordingly, the pins 50 do not impede movement of the drawbar assembly 28 along a longitudinal axis of the receiver tube 26. In the embodiment shown, the distal end of the pins 50 are curved so that in the position shown in FIGS. 7 and 8, the pins 50 do not extend into the slots 54 of the receiver tube 26.

Figure 9:
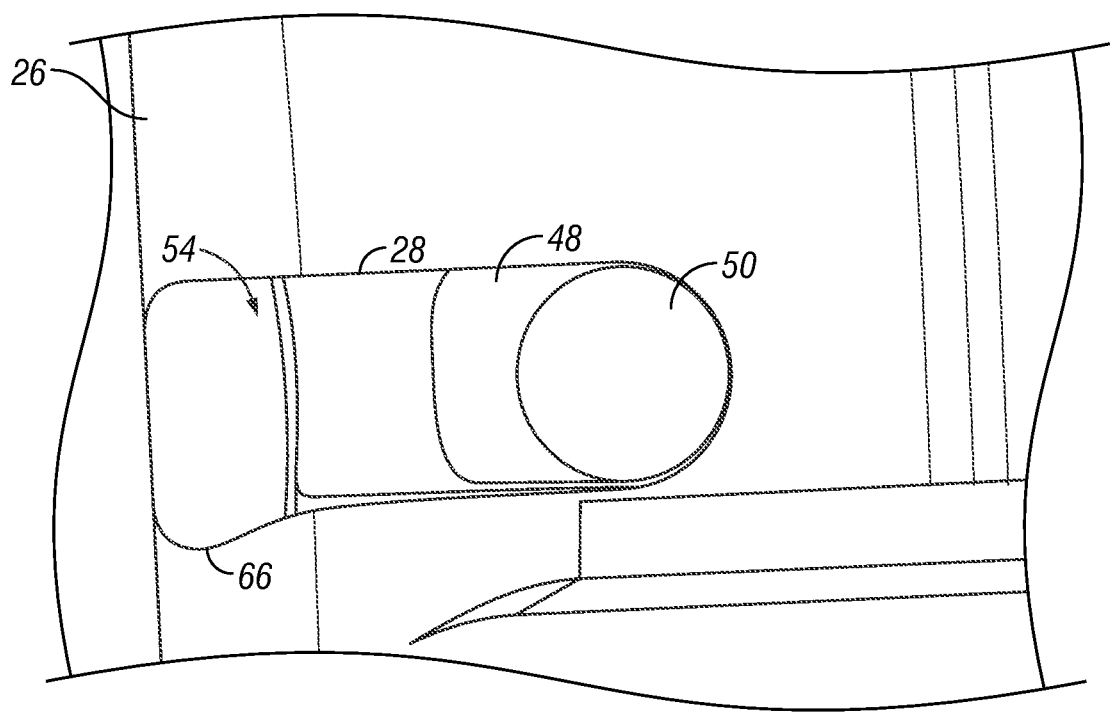
FIG. 9 is a detailed side view of the drawbar assembly with the pin rotated to the second position.
Figure 10:
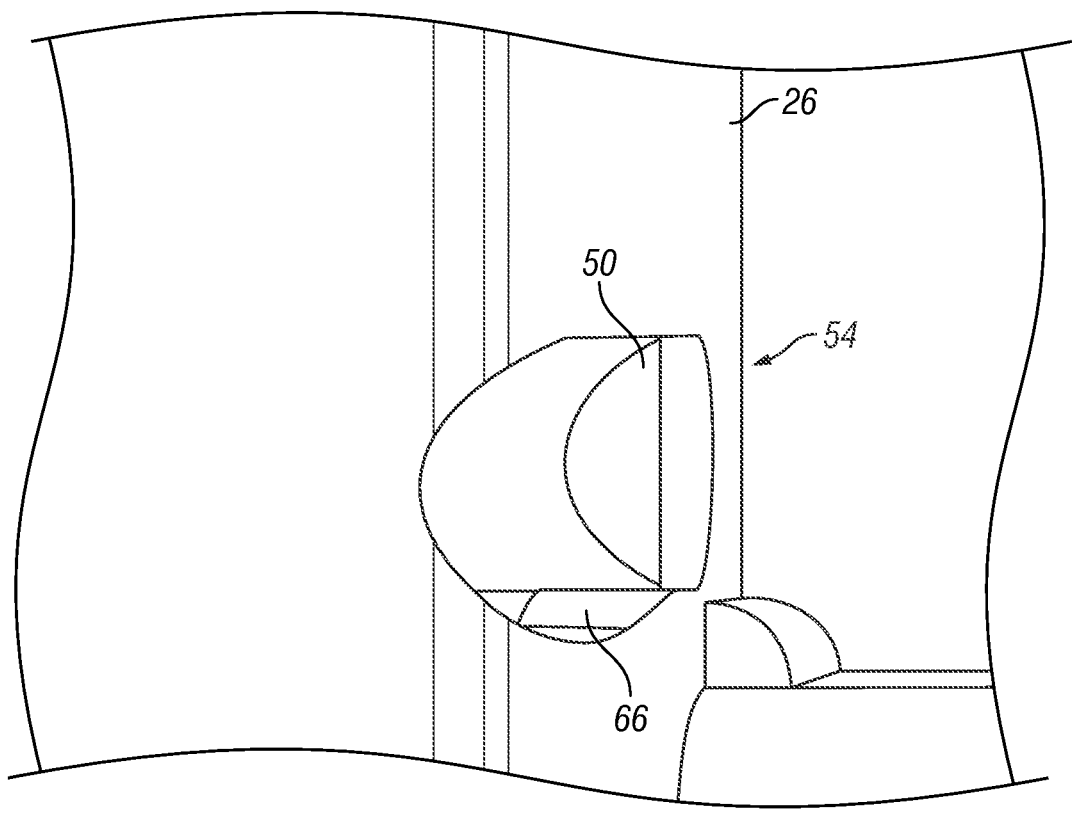
FIG. 10 is a detailed rear view of the drawbar assembly with the pin rotated to the second position.

FIGS. 9 and 10 show the relative position of the pins 50 with respect to the slots 54 when the handle 42 is in the second position, in which the third section 40 of the drawbar assembly 28 is attached to the receiver tube 26. As can be seen, the pins 50 in this position extend into the slots 54, thereby impeding movement of the drawbar assembly 28 with respect to the receiver tube 26. As the pins 50 move toward this position, the pins 50 cam on the curved bottom surface 66 of the slots 54. This camming action moves the third section 40 of the drawbar assembly 28 upward (as shown in this embodiment) against the urging of spring 58, which puts tension between the pins 50 and the slots 54 to lock together the drawbar assembly 28 with the receiver tube 26. When the pins 50 move back to the position shown in FIGS. 7 and 8 based on movement of the handle 42 to the first position, the pins 50 cam on the bottom curved surface of the slots 54 to reduce tension with spring 58 and allow the drawbar assembly 28 to be detached.

In operation, the user would insert the distal end 32 of the drawbar assembly 28 into the receiver tube 26 with the handle 42 in the first position. Upon inserting the drawbar assembly 28 fully into the receiver tube 26, the slots 52 of the drawbar assembly 28 are aligned with the slots 54 of the receiver tube 26. The user moves the handle 42 from the first position to the second position. This action of the handle 42 moves the pins 50 to cam on the bottom curved surface of the slots 54, which moves the drawbar assembly upward against the urging of the spring 58, and extends the pins 50 into the slots 54 to impede longitudinal movement of the drawbar assembly 28 with respect to the receiver tube as shown in FIGS. 9 and 10. When the user wishes to detach the drawbar assembly 28 from the receiver tube 26, the user would move the handle 42 to the first position, which moves the pins to the position shown in FIGS. 7 and 8. In this position, the pins 50 do not extend into the slots 54, and therefore do not impede longitudinal movement of the drawbar assembly 28 out of the receiver tube 26. Accordingly, the user can remove the drawbar assembly 28 from the receiver tube 26.

EXAMPLES

Illustrative examples of the hitch assembly disclosed herein are provided below. An embodiment of the hitch assembly may include any one or more, and any combination of, the examples described below.

Example 1 is a hitch assembly. In some embodiments, the hitch assembly a receiver tube coupled with a bumper structure and defines a longitudinally-extending opening. The hitch assembly includes a drawbar assembly with an elongated body and a rod. The elongated body is dimensioned to be received within the opening in the receiver tube and defines a longitudinally-extending passageway. The rod is rotatably received within the longitudinally-extending passageway between a first position and a second position. In some embodiments, the drawbar assembly includes a section extending approximately perpendicularly from the elongated body. The rod includes a detent feature that couples together the elongated body and the receiver tube when the rod is rotated to the second position and detaches the elongated body and the receiver tube when the rod is rotated to the first position.

In Example 2, the subject matter of Example 1 is further configured such that the elongated body defines one or more traverse slots.

In Example 3, the subject matter of Example 2 is further configured such that the receiver tube defines one or more transverse slots.

In Example 4, the subject matter of Example 3 is further configured such that the one or more slots in the elongated body are arranged to correspond with the one or more slots in the receiver tube when the elongated body is inserted into the opening in the receiver tube.

In Example 5, the subject matter of Example 4 is further configured such that the rod includes one or more radially-extending pins.

In Example 6, the subject matter of Example 5 is further configured such that the one or more radially-extending pins extend through respective slots of the one or more slots in the elongated body.

In Example 7, the subject matter of Example 6 is further configured such that the one or more radially-extending pins extend through respective slots of the one or more slots in the receiver tube when the rod is in the second position to impede longitudinal movement of the elongated body with respect to the receiver tube when the rod is in the second position.

In Example 8, the subject matter of Example 7 is further configured such that the one or more radially-extending pins do not extend through the one or more slots in the receiver tube when the rod is in the first position to allow free longitudinal movement of the elongated body with respect to the receiver tube when the rod is in the first position.

In Example 9, the subject matter of Example 8 is further configured such that the rod has a first end extending through the elongated body and a second end connected with a handle.

In Example 10, the subject matter of Example 9 is further configured such that the handle is configured to pivot between a first position and a second position, and pivoting of the handle between the first position and the second position causes concomitant movement of the rod between the first position and the second position.

In Example 11, the subject matter of Example 10 is further configured such that the handle pivots along an axis that is generally perpendicular to a longitudinal axis of the elongated body.

In Example 12, the subject matter of Example 11 is further configured such that the section includes a recessed portion dimensioned to receive the handle when in the second position.

In Example 13, the subject matter of Example 11 is further configured such that the hitch assembly includes a lock movable between a locked position and an unlocked position, wherein the lock is configured to prevent rotation of the handle when in the locked position and allows rotation of the handle when in the unlocked position.

In Example 14, the subject matter of Example 13 is further configured such that the lock is positioned at the junction between the section and the elongated body.

In Example 15, the subject matter of Example 1 is further configured such that the receiver tube includes at least two transverse slots and the elongated body includes at least two corresponding slots.

In Example 16, the subject matter of Example 15 is further configured such that the at least two slots in the receiver tube and the at least two slots in the elongated body are spaced apart along a longitudinal axis of the receiver tube.

In Example 17, the subject matter of Example 16 is further configured such that the rod includes at least two radially-extending pins spaced apart along the longitudinal axis of the receiver tube.

In Example 18, the subject matter of Example 17 is further configured such that the hitch assembly further includes a biasing member configured to urge the elongated body away from the receiver tube.

In Example 19, the subject matter of Example 18 is further configured such that the at least two slots of the receiver tube include a curved bottom surface, wherein the curved bottom surface is configured to move the elongated body longitudinally with respect to the receiver tube when the rod rotates from the first position to the second position.

In Example 20, the subject matter of Example 19 is further configured such that the longitudinal movement of the elongated body with respect to the receiver tube when the rod rotates from the first position to the second position overcomes urging of the biasing member.

Although the present disclosure has been described with reference to particular means, materials and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A method of connecting and disconnecting a drawbar with a hitch assembly, the method comprising:
   providing a receiver tube coupled with a bumper structure, wherein the receiver tube defines one or more transverse slots and a longitudinally-extending opening;
   providing a drawbar assembly, wherein the drawbar assembly comprises: (i) an elongated body dimensioned to be received within the opening in the receiver tube, wherein the elongated body defines a longitudinally-extending passageway and one or more traverse slots arranged to correspond with the one or more slots in the receiver tube when the elongated body is inserted into the opening in the receiver tube; (ii) a rod with one or more radially extending pins rotatably received within the longitudinally-extending passageway between a first position and a second position, wherein the one or more radially-extending pins extend through respective slots of the one or more slots in the elongated body and respective slots of the one or more slots in the receiver tube when the rod is in the second position to impede longitudinal movement of the elongated body with respect to the receiver tube when the rod is in the second position, but the one or more radially-extending pins do not extend through the one or more slots in the receiver tube when the rod is in the first position to allow free longitudinal movement of the elongated body with respect to the receiver tube when the rod is in the first position, wherein the rod has a first end extending through the elongated body and a second end connected with a handle, wherein the handle is configured to pivot between a first position and a second position along an axis that is generally perpendicular to a longitudinal axis of the elongated body, and pivoting of the handle between the first position and the second position causes concomitant movement of the rod between the first position and the second position; and (iii) a section extending approximately perpendicularly from the elongated body;
   coupling together the elongated body and the receiver tube with a detent feature of the rod by rotating the rod to the second position; and
   detaching the elongated body from the receiver tube by rotating the rod to the first position.

2. The method of claim 1, wherein the section includes a recessed portion dimensioned to receive the handle when in the second position.

3. The method of claim 1, further comprising a lock movable between a locked position and an unlocked position, wherein the lock is configured to prevent rotation of the handle when in the locked position and allows rotation of the handle when in the unlocked position.

4. The method of claim 3, wherein the lock is positioned at the junction between the section and the elongated body.

5. A method of connecting and disconnecting a drawbar with a hitch assembly, the method comprising:
   providing a receiver tube coupled with a bumper structure, wherein the receiver tube defines a longitudinally-extending opening;
   providing a drawbar assembly, wherein the drawbar assembly comprises: (i) an elongated body dimensioned to be received within the opening in the receiver tube, wherein the elongated body defines a longitudinally-extending passageway and one or more traverse slots; (ii) a rod rotatably received within the longitudinally-extending passageway between a first position and a second position; and (iii) a section extending approximately perpendicularly from the elongated body;
   coupling together the elongated body and the receiver tube with a detent feature of the rod by rotating the rod to the second position;
   detaching the elongated body from the receiver tube by rotating the rod to the first position;
   wherein the receiver tube includes at least two transverse slots and the elongated body includes at least two corresponding slots;
   wherein the at least two slots in the receiver tube and the at least two slots in the elongated body are spaced apart along a longitudinal axis of the receiver tube;
   wherein the rod includes at least two radially-extending pins spaced apart along the longitudinal axis of the receiver tube; and
   further comprising a biasing member configured to urge the elongated body away from the receiver tube.

6. The method of claim 5, wherein the at least two slots of the receiver tube include a curved bottom surface, wherein the curved bottom surface is configured to move the elongated body longitudinally with respect to the receiver tube when the rod rotates from the first position to the second position.

7. The method of claim 6, wherein the longitudinal movement of the elongated body with respect to the receiver tube when the rod rotates from the first position to the second position overcomes urging of the biasing member.

* * * * *